(No Model.)
H. WADE, J. J. YUNCKER & J. N. CLOUSE.
COFFEE ROASTER.
No. 305,725. Patented Sept. 23, 1884.
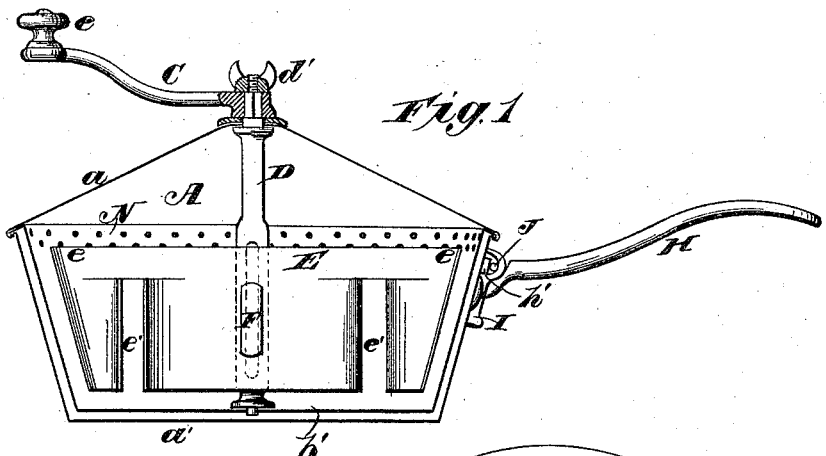
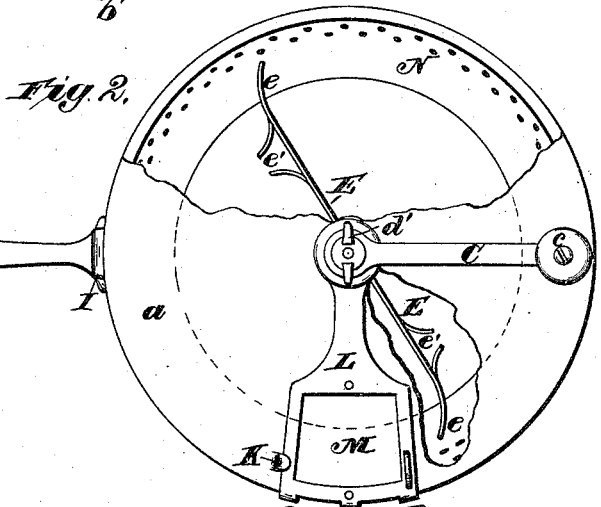
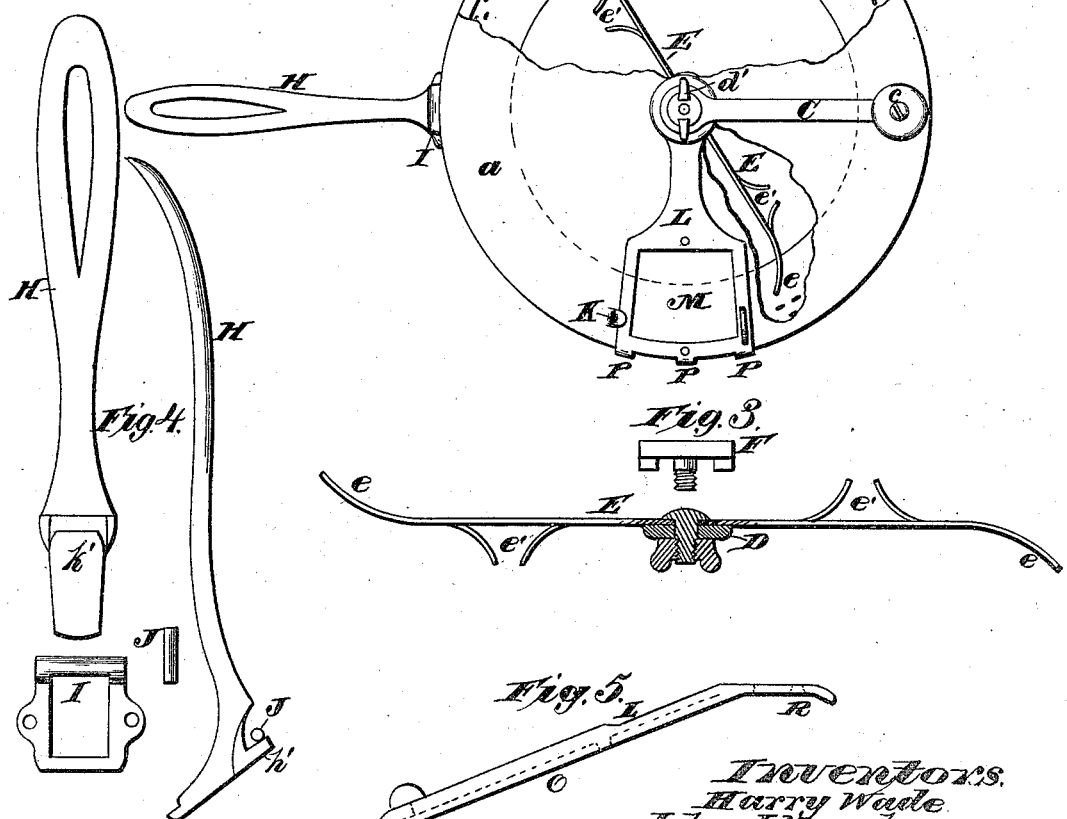
Witnesses.
Robt Everett
A. H. Norris
Inventors.
Harry Wade
John J. Yuncker
Joseph N. Clouse
By James L. Norris
Atty.

United States Patent Office.

HARRY WADE, OF TOLEDO, JOHN J. YUNCKER, OF MANSFIELD, AND JOSEPH N. CLOUSE, OF TOLEDO, OHIO; SAID CLOUSE ASSIGNOR TO SAID WADE.

COFFEE-ROASTER.

SPECIFICATION forming part of Letters Patent No. 305,725, dated September 23, 1884.

Application filed January 11, 1884. (No model.)

*To all whom it may concern:*

Be it known that we, HARRY WADE, JOHN J. YUNCKER, and JOSEPH N. CLOUSE, citizens of the United States, residing, respectively, at Toledo, in the county of Lucas, Mansfield, in the county of Richland, and Toledo, in the county of Lucas, State of Ohio, have invented new and useful Improvements in Coffee-Roasters for Hotel, Restaurant, and Family Use, of which the following is a specification.

Our invention relates to improvements in coffee-roasters, such as are used on stoves, ranges, &c., consisting of a shell or receptacle for the coffee and a means of agitating the coffee while roasting; and the objects of our invention, after long and careful experimenting, are, first, to utilize the heat in roasting to the greatest extent; second, to provide the most complete form and construction of an adjustable stirring-paddle or agitator; third, to provide an easy means of seeing the coffee at any stage of the roasting process; and, fourth, to so construct the roaster that it will be in the simplest form for manufacturing and the most convenient form for handling and shipping. We attain these objects by the mechanism illustrated in the accompanying drawings, in which—

Figure 1 is a vertical cross-section of the roaster complete; Fig. 2, a top view of the same complete; Fig. 3, an enlarged detail view, partly in section, of the shaft with the adjustable paddle or agitator. Fig. 4 is an enlarged detail view of the adjustable or detachable handle and its plate. Fig. 5 is an enlarged detail view of the door with its window, similar letters referring to similar parts in all the views.

A represents the shell of the roaster, with its conical top $a$ and bottom $a'$.

B represents an inside shell with a solid bottom, $b'$, and perforations N N near the top, the upper edge of which is turned out in a flange, which rests against the top $a$ and the outer shell, thus forming a hot-air chamber and admitting the heat into the body of the roaster through the perforations N N above the coffee, thus producing the most even heat and the greatest economy of the heat.

D is a post or shaft pivoted in the bottom $b'$, to which post D is secured a peculiarly-shaped paddle, E, or agitator, which is adjustable by means of the clamp-bolt F and its thumb-nut $f$, working in the slot in the post D.

The peculiar construction of the paddle or agitator E is that it has forward-curved ends, $e\ e$, and backward, outward, and inward curved wings, $e'\ e'$, cut from the solid web of the paddle E. The operation of the paddle E carries the coffee from the center outward and from the extreme outside toward the center. The upper end of the post or shaft D extends through the conical top $a$, and forms, first, a bearing for the arm of the door L, next a square for the crank C, with its knob $c$, and then a threaded end to receive the thumb-nut $d'$.

L is a sliding door pivoted to the center post, D, by the arm and hole R, in which door L is inserted a window, M, of mica, glass, or any other suitable transparent material, held in position by means of a frame, O, and rivets. Projecting hooks P P P on the outer edge of the door L catch over the projecting seam of the top $a$ and secure the door in position against the top and leave it free to slide around the shell A and against the stop K when closed, being operated by means of the thumb projection $l$ on the edge of the frame of the door L.

I is a clasp secured to the shell A by means of rivets, into the opening of which is inserted a handle, H, having a projecting stud or arm, $h'$. When in position, the lower end of the handle H is locked in behind the lower side of the clasp I, and brought up in position in the opening of the clasp I and firm against the shell A, and made secure by means of a stub of wire, J, driven behind the clasp I in its upper arched side and in front of the stud or arm $h'$. This stub of wire J may be driven out at any time and the handle H removed for the convenience of packing and storing, and is also out of the way in reaming on the top $a$. The handle H and clasp I are particularly well adapted for use in connection with a coffee-roaster, as illustrated, but will discharge a like function when applied to other cooking utensils.

Having described the working and stationary parts of our improved coffee-roaster, the operation is briefly as follows: Adjust the paddle E through the open door L by means of the thumb-nut *f* and the other parts, as described. Pour in the coffee, close the door L, and turn the crank C in the direction of a right-hand screw-thread. By turning the roaster over on the side, so that the coffee comes in contact with the window, the operator can easily ascertain the condition of the browning process. A small door in the side of the shell at the bottom, as seen at Q, Fig. 1, serves to make the hot-air chamber a cooling-chamber and to let out any dirt that may have passed through the perforations N N.

Having thus described our invention so as to enable any one skilled in the arts to manufacture and operate it, what we claim as new, and desire to secure by Letters Patent, is—

1. A coffee-roaster consisting of the outer vessel, the inner vessel having a closed bottom and a line of perforations around its upper edge, and arranged within the outer vessel to provide the intervening hot-air chamber, from which the hot air can only pass into the inner vessel through the line of perforations at its upper edge, a shaft journaled to rotate in the inner vessel and extending through the outer vessel, and an agitator on the shaft to agitate the coffee as it is being roasted, substantially as described.

2. A coffee-roaster consisting of the outer vessel having a top cover, the inner vessel having a solid bottom and a line of perforations around its upper edge, and arranged in the outer vessel to provide the hot-air chamber, from which the hot air can only pass into the inner vessel through the line of perforations at its upper edge, a shaft journaled to rotate in the inner vessel, and having a slot, an agitator-wing, and a clamping-bolt passing through the agitator-wing, and the slot in the shaft to permit the bolt and attached agitator-wing to be vertically adjusted, substantially as described.

3. The combination, with the vessel having a shaft supported vertically therein, of an agitator-paddle having curved ends, and provided on its face with lateral wings converging toward each other at their outer ends, substantially as described.

4. The combination, with a covered receptacle having an opening in its top, of a transparent sliding door to said top provided with a hook at its lower end to engage with a projecting part of the vessel, so as to slide therein, and a stop to check the movement of said door, substantially as described.

5. The combination, with a cooking utensil, of a clasp, I, a detachable handle, H, formed with an arm, *h'*, to engage therewith, and a pin, J, for locking said handle to said clasp, substantially as described.

In testimony whereof we have hereunto set our hands in the presence of two subscribing witnesses.

HARRY WADE.
JOHN J. YUNCKER.
JOSEPH N. CLOUSE.

Witnesses:
SAMUEL KOHN,
C. S. CURTIS.